United States Patent [19]

Mattatall

[11] 4,379,988

[45] Apr. 12, 1983

[54] MOLDED HEARING AID AND BATTERY CHARGER

[76] Inventor: Patricio Mattatall, P.O. Box 910, Winter Park, Fla. 32789

[21] Appl. No.: 226,212

[22] Filed: Jan. 19, 1981

[51] Int. Cl.³ .......................... H02J 7/02; H04R 25/02
[52] U.S. Cl. ................................... 320/4; 179/107 R; 320/48
[58] Field of Search .................. 179/107 R; 320/2, 4, 320/48

[56] References Cited

U.S. PATENT DOCUMENTS

| | | | |
|---|---|---|---|
| 3,195,540 | 7/1965 | Waller | 320/2 UX |
| 3,493,695 | 2/1970 | Stork | 179/107 R |
| 3,867,950 | 2/1975 | Fischell | 320/2 X |
| 3,885,211 | 5/1975 | Gutai | 320/2 |
| 3,938,018 | 2/1976 | Dahl | 320/2 |
| 4,005,412 | 1/1977 | Leander | 320/2 X |
| 4,177,413 | 12/1979 | Ascoli | 320/48 X |

*Primary Examiner*—A. D. Pellinen
*Attorney, Agent, or Firm*—Duckworth, Allen, Dyer & Pettis

[57] ABSTRACT

A molded hearing aid of the self-containing type having a rechargeable battery disposed therein, in the form of a molded plug which will fit in the ear of the user. A light emitting diode is disposed through the external surface of the plug and is internally connected in series with an iron core inductor with the series combination in parallel with the internal chargeable battery. A battery charger is provided having a cup for receiving the molded plug and having a multiturn coil wound around the periphery of the cup. The coil is connected into an oscillator circuit and tuned to cause the circuit to oscillate at about 30 kHz. The oscillator coil couples to the iron core inductor in the plastic plug thereby inducing a 30 kHz ac voltage across the coil. The light emitting diode rectifies the alternating current and is connected in a polarity so as to charge the internal battery of the hearing aid. As the charging current flows through the light emitting diode, the diode is illuminated indicating to the user that charging is taking place and indicating by its brillance when the hearing aid is located in its optimum position.

6 Claims, 7 Drawing Figures

MOLDED HEARING AID AND BATTERY CHARGER

BACKGROUND OF THE INVENTION

1. Field of the Invention

The present invention relates to a battery charging system for miniature hearing aid devices having an internal rechargeable battery and more particularly to a system which provides positive indication to the user that the battery is charging.

2. Description of the Prior Art

Rapid advancements have been made in the hearing aid technology with the advent of microelectronic circuits. For example, it is now possible to provide a hearing aid in the form of a molded plug which will fit in the ear of the user and which contains an integrated circuit amplifier, input and output transducers, a volume control and switch, and a rechargeable battery. However, due to the requirement for very small size, the batteries such as are now in common use have a small energy storage capacity and therefore must frequently be recharged. In known prior art hearing aids of the self-contained type, it is common to have extremely small, receptacle-type contacts embedded in the device. At night or at other times when the hearing aid is not in use, the user plugs a cable from a battery charger into such contacts for recharging of the battery. Due to the small sizes required for such connectors and the frequent use thereof, many problems are experienced from wear and breakage of the contacts, poor connections, and similar mechanical type problems. Another factor which makes such charging system somewhat unsatisfactory is that many wearers of hearing aids are elderly and have poor eyesight. This leads to difficulties for such users in making the necessary connection and to inadvertent damage during attempts to plug in the battery charger.

The present invention overcomes such problems and difficulties experienced with prior art battery charging systems for small, self-contained hearing aid devices.

SUMMARY OF THE INVENTION

The present invention dispenses entirely with the requirement of a mechanical and electrical connection between the hearing aid unit and the battery charger. A small iron core inductor is molded into the body of the hearing aid and a light emitting diode (LED) is connected in series with the inductor across the rechargeable battery. The LED is polarized to match the polarity of the battery. A battery charger is provided which includes a small plastic cup. A tapped inductor is wound around the outside of the cup and is connected into an oscillator circuit to form an oscillator operating at about 30 kHz. A line connected dc power supply provides power to the oscillator.

When the battery in the hearing aid is to be recharged, the user removes the device from his ear and places it in the plastic cup in the magnetic field present within the oscillator coil. The inductor in the hearing aid body is disposed so as to provide maximum inductive coupling to the oscillator coil and therefore, an ac voltage at the frequency of oscillation is induced in the inductor. The LED acts as a diode rectifier to rectify the induced ac voltage to provide a pulsating dc charging circuit to the hearing aid battery. At the same time that the LED is acting as a rectifier, it also emits visual radiation. Advantageously, the bulb portion of the LED projects slightly from the outer face of the hearing aid unit and the light produced by the LED is a positive indication to the user that the battery is being charged. It has been found that the maximum energy transfer from the oscillator to the inductor occurs when the hearing aid portion containing the inductor is as close as possible to the oscillator coil winding. The LED thus will indicate by its brightness when the user has the hearing aid located in its optimum position.

It is therefore a principal object of the invention to provide a self-contained miniature hearing aid that can be inserted in the user's ear and in which a self-contained rechargeable battery can be recharged with no physical connection to the hearing aid unit.

It is another object of the invention to provide a miniature hearing aid in which a self-contained battery can be charged with no physical connection thereto and which provides a positive indication to the user that charging is in progress.

It is still another object of the invention to provide a charging system for a self-contained rechargeable battery in a miniature hearing aid having an oscillator which can be coupled to an inductor disposed within the hearing aid to transfer energy thereto.

It is yet another object of the invention to provide a hearing aid having an LED which simultaneously rectifies induced ac voltage in the hearing aid inductor for charging a self-contained battery and to provide visible indication that charging is taking place.

It is a further object of the invention to provide a miniature hearing aid having a self-contained rechargeable battery and a charging system for the battery which can be used by elderly and infirm persons by simply dropping the miniature hearing aid unit into a small plastic cup.

It is yet a further object of the invention to provide a battery charging system for a miniature hearing aid which provides a small amount of heat to the hearing aid unit during charging to minimize the effects of humidity on the life of the hearing aid unit.

These and other objects and advantages of the invention will become apparent from the following detailed description of the drawings.

DETAILED DESCRIPTION OF THE INVENTION

Figure 1:
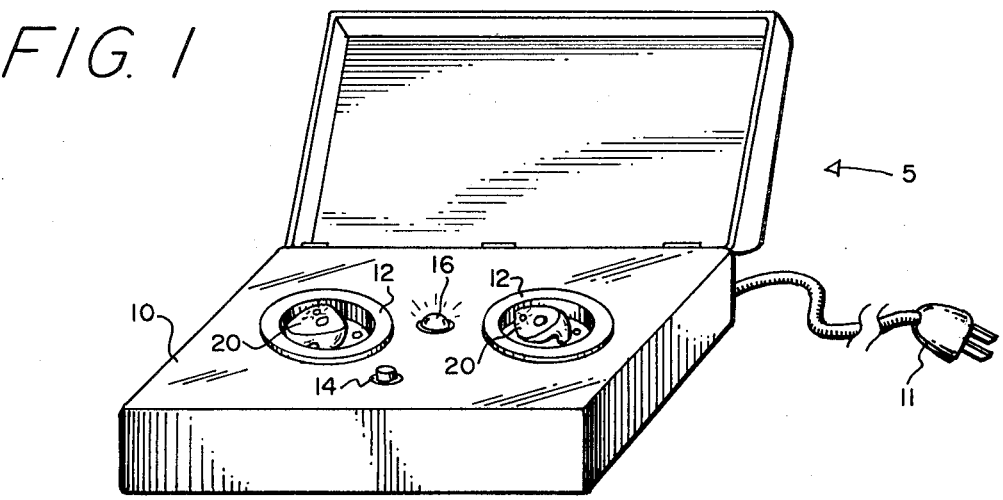
FIG. 1 is a perspective view of a hearing aid battery charging system in accordance with the invention which provides for charging of two batteries simultaneously.

Turning first to FIG. 1, I have shown a perspective view of a typical charging unit of the invention in a case 5 having a top panel 10. The unit depicted therein has provisions for simultaneously charging the internal battery for two hearing aids 20. Two charging cups 12 are mounted in panel 10 and adapted to permit hearing aids 20 to be dropped into the cup portion. Primary power is supplied from a 115 volt ac line via plug 11 with on/off switch 14 and power lamp 16 utilized to turn the unit off and on. While I have shown a dual unit in FIG. 1, it will be apparent that the charging unit can be implemented singly or in multiple units as is required by the user.

Figure 2:
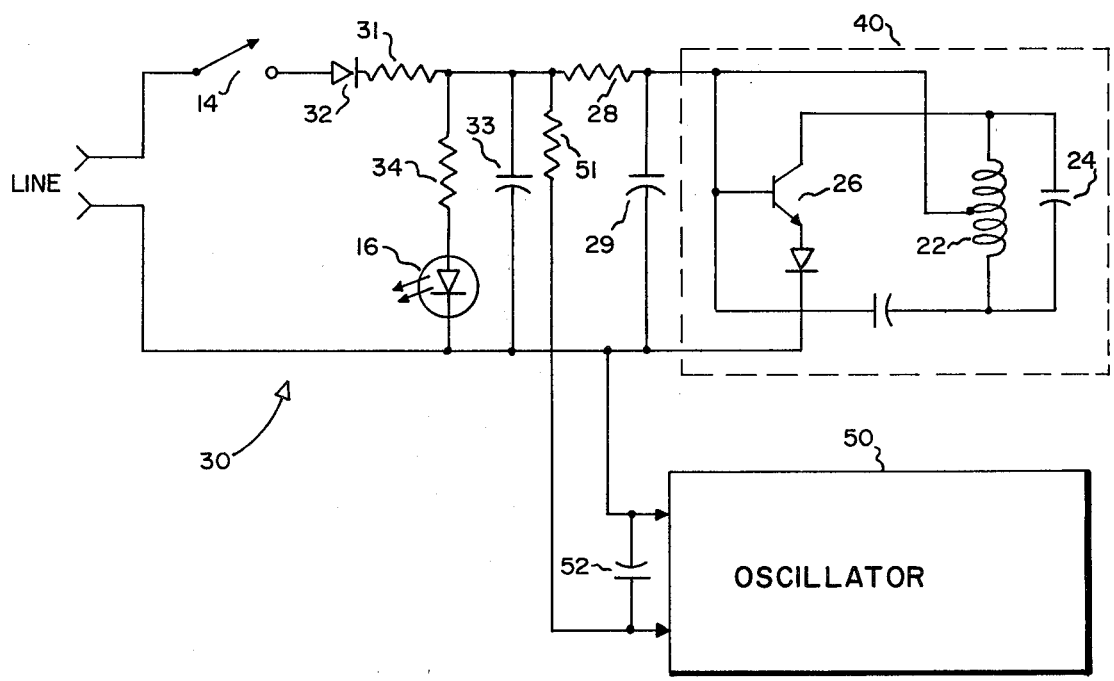
FIG. 2 is a schematic diagram of the charging system for the unit shown in FIG. 1.

FIG. 2 represents a schematic diagram for the charger shown in FIG. 1. The unit consists of three sections: a dc power supply 30; a first oscillator 40 and a second oscillator 50. Although any suitable type of power supply may be used, the very small amount of energy required advantageously permits the use of a simple half-wave rectifier circuit utilizing diode 32, limiting resistor 31, and filter capacitor 33. Pilot lamp 16 may be an LED with a series dropping resistor 34. Oscillator 40 utilizes tapped coil 22 resonated by capacitor 24 to the desired operating frequency said tapped coil providing the necessary positive feedback for oscillation. This frequency is not critical; however, I have found that a frequency of about 30 kHz provides efficient operation of the system. Transistor 26 is therefore used in conjunction with resonator circuit formed by coil 22 and capacitor 24 to form oscillator 40. Resistor 28 and capacitor 29 serve as a decoupling network and to drop the supply voltage to the voltage required by transistor 26. Oscillator 50 is identical to oscillator 40 and is supplied power via decoupling network comprising resistor 51 and capacitor 52.

Figure 3:
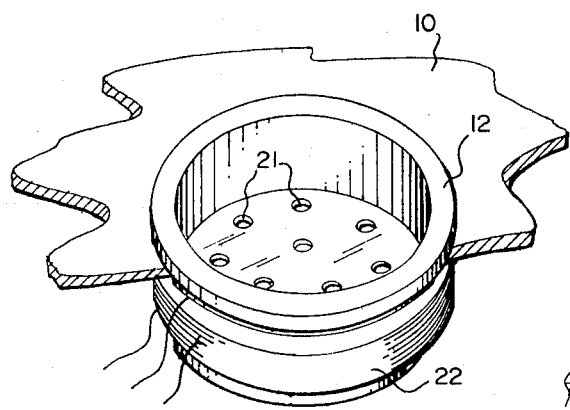
FIG. 3 is a partial and cut away view of the charging cup used with the system of FIG. 1.
Figure 4:
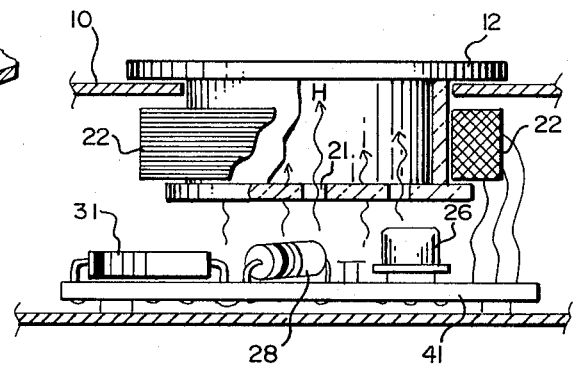
FIG. 4 is a cross sectional and partial view of the charging cup showing the configuration of the electrical circuit components.

Turning now to FIG. 3, a cutaway view of panel 10 with charging cup 12 installed therein is shown. Referring to FIG. 3 and FIG. 4, it may be noted that coil 22 is wound around the outer periphery of cup 12. The bottom of cup 12 includes a series of openings 21.

Referring to FIG. 4, case 5 is shown in cross-section with charging cup 12 partially cut away. As may be noted, I place a printed circuit board 41 immediately below the bottom surface of cup 12. Printed circuit board 41 is utilized to mount the various electrical components indicated in FIG. 2. As may be understood, direct rectification of the 115 volt line voltage in the power supply of FIG. 2 may produce a dc voltage of about 150 volts. It is necessary to drop this voltage down to a value suitable for transistor 26 which is usually in the 6–12 volt range. Therefore, the majority of the input energy to the power supply unit will be dissipated as heat from dropping resistors 28 and 51. Advantageously, I take advantage of this heat which will rise through openings 21 as shown by the wavy arrows H. When a hearing aid unit is placed in cup 12 for charging of its internal battery, as will be explained more fully below, this relatively small amount of heat will dry out moisture which may have collected in and around the hearing aid unit during wearing by the user from humidity, and from perspiration and the like. I have found that the useful life of the miniature hearing aid can be significantly extended by preventing ultimate intrusion of moisture into the electronic circuits of the hearing aid.

Figure 5:
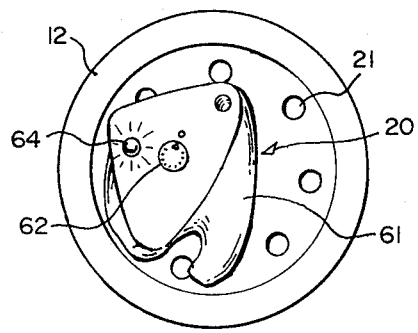
FIG. 5 is a top view of the charging cup with a hearing aid unit placed therein for charging of a battery.
Figure 6:
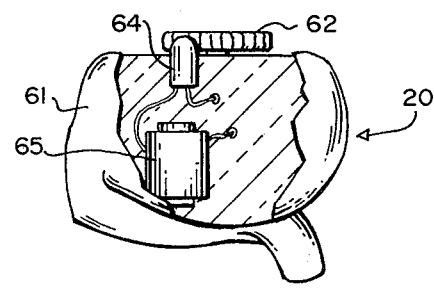
FIG. 6 is a partially cut away view of a miniature hearing aid showing the special elements for charging of an internal battery in accordance with the invention.

In FIG. 5, I have shown a top view of the miniature hearing aid 20 placed in charging cup 12. The hearing aid of the invention is custom molded to fit exactly in the user's ear with a portion of the body 61 projecting into the ear canal through which the amplified sound from the output transducer is conducted. Body 61 includes a flat surface which projects outward from the user's ear, and mounts a switch and volume control knob 62 with which the user can turn the unit on and off and adjust the sound level to an appropriate point. An opening is also provided leading to the input transducer or microphone. Also on this panel, the bulb end of an LED 64 projects slightly. Referring now to FIG. 6, a partial cross sectional view of hearing aid 20 is shown with body 61 partially cut away. A small coil 65 is mounted having a magnetic core and is disposed with the central axis essentially vertical in the position shown. LED 64 is seen with one side thereof connected to coil 65.

Figure 7:
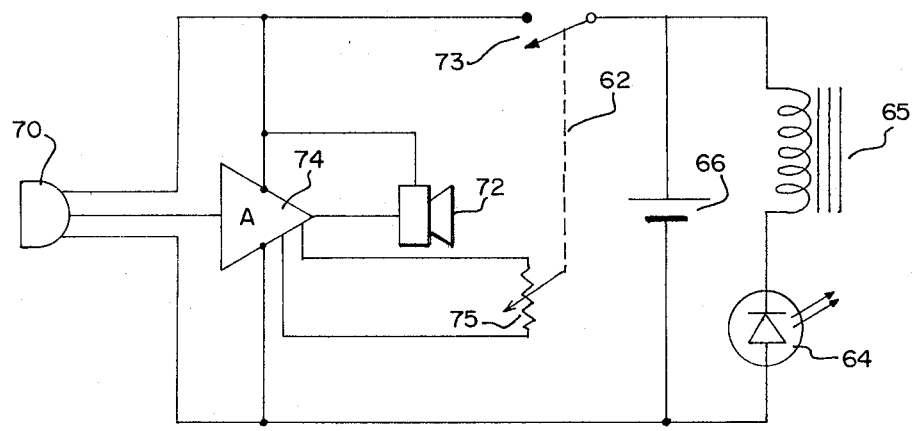
FIG. 7 is a simplified schematic diagram of the hearing aid of FIG. 6.

FIG. 7 gives a simplified schematic diagram of the hearing aid 20. As shown, inductor 65 in series with LED 64 is connected in parallel with the internal rechargeable battery 66. The remainder of the hearing aid is not part of my invention and is shown to indicate the load which battery 66 sees during use of the hearing aid. Microphone 70 is the input transducer which drives an integrated circuit amplifier 74 which in turn operates output transducer 72. Control knob 62 operates switch 73 and volume control 75.

Having now described the circuitry and construction of my miniature hearing aid and battery charger, the use thereof will now be described. Due to the limitations of space in hearing aid 20, battery 66 has relatively small capacity, typically 20 ma/hr. Thus, even though the electronics of FIG. 7 requires only a small amount of power, it is necessary to recharge battery 66 frequently. It is usual for the user to remove the hearing aid at night while sleeping and to utilize that time for charging of battery 66. When the user desires to place the battery on charge, he removes the hearing aid from his ear and places it in charging cup 12 as shown in the top view, FIG. 5. This act places inductor 65 in the center of oscillator coil 22 with the axes of inductor 65 and coil 22 in parallel. Therefore, the magnetic field produced by coil 22 induces an electromagnetic force in coil 65. Referring to FIG. 7, it may be noted that the induced voltage across coil 65, which will be at the same frequency as that of oscillator 40, will produce current flow through light emitting diode 64 and battery 66 in a direction to recharge battery 66. As is apparent, LED 64 acts as a half-wave diode rectifier and each half-wave rectified pulse of voltage will produce a corresponding pulse of current through battery 66 as desired. As LED 64 passes the rectified current, the emission of light occurs, as is well known, and the portion of LED 64 projecting above the flat portion of body 61 of hearing aid 20 as seen in FIGS. 5 and 6 will glow brightly. Thus, the user is aware that the charger is properly operating and the battery is indeed being charged.

This indication is of great value since it will generally prevent the user from placing his hearing aid into the charging cup and neglecting to turn on the primary power to the charger. The LED serves an additional function in permitting the user to optimally position hearing aid 20 in charging cup 12. I have found that, due to the small size of inductor 65, that maximum coupling occurs when the portion of hearing aid 20 containing inductor 65 is in its closest proximity to coil 22 and therefore LED 64 will be brightest in such position. The user merely positions the hearing aid 20 such that the portion containing LED 64 touches an inner wall of charging cup 12. As will be noted from FIG. 6, the axis of LED 64 is essentially aligned with that of coil 65 and permits LED 64 to indicate mechanically the portion of the body 61 that is to be in contact with the inner wall of cup 12. The hearing aid 20 may draw about 0.4 to 0.5 ma when in use and a charging rate of about 2 ma is satisfactory. During charging it is desirable that switch 73 be in the off position to eliminate any drain during the charging operation.

As may now be recognized, I have disclosed a simple and very reliable battery charging system for a miniature hearing aid having an internal rechargeable battery and which can be safely and easily operated by elderly and infirm persons. It is only necessary to place the hearing aid in a small plastic cup and to adjust the position for a maximum brightness of the LED indicator in the hearing aid which assures the user that the position is optimum and that charging is taking place. Since I provide no plugs or electrical contacts and the coupling between the charging unit and the hearing aid is purely inductive, no trouble will be experienced in poor or broken connections as in prior art units.

While I have shown specific circuits and mechanical construction in the preferred embodiment, it will be obvious to those of skill in the art that many other configurations of the hearing aid holder, the oscillator coil, the pick up inductor, and other parts may be made without departing from the scope or the spirit of the invention.

I claim:

1. A self-contained hearing aid insertable in the ear of the user and having a rechargeable battery, the battery charging system comprising:
   oscillator means for producing electrical oscillations;
   a first inductor associated with said oscillator means for producing an inductive magnetic field from said electrical oscillations;
   holding means for supporting said hearing aid for charging said rechargeable battery;
   a second inductor disposed within said hearing aid, said holding means supporting said hearing aid in a manner to inductively couple said first inductor and said second inductor whereby an electromotive force is induced in said second inductor; and
   a light emitting diode disposed in said hearing aid and visible externally thereto, said diode connected in series with said second inductor, the series combination of said diode and said second inductor connected in parallel with said battery, whereby said electromotive force induced in said second inductor causing said diode to produce a pulsating direct current flowing in the direction to charge said battery and to emit a light external to said hearing aid to indicate such flow of charging current, said hearing aid position adjustable within said holding means by the user to maximize the degree of inductive coupling between said first and second inductors, said light emitting diode functioning to indicate said degree of coupling by the intensity of emitted light therefrom.

2. The system as defined in claim 1 in which said second inductor is a part of a resonant circuit of said oscillator means.

3. The system as defined in claim 2 in which said hearing aid holding means includes:
   a cylindrical cup fabricated from a non-magnetic material having sufficient capacity to permit insertion of said hearing aid into said cup and to permit movement of said hearing aid within said cup; and
   a multiplicity of turns of a wire conductor forming windings around the external walls of said cup, said windings forming said first inductor.

4. The system as defined in claim 3 in which said oscillator means comprises:
   dc power supply means; and
   a turning capacitor connected essentially in parallel with said first inductor for resonating said inductor to the desired frequency of oscillation;
   transistor means connected to said first inductor and said power supply, said connection including a positive feedback path so as to produce said electrical oscillations.

5. In a self-contained hearing aid for insertion in the ear of the user and having input and output transducers, audio amplifier means, control means, and a rechargeable battery, the improvement comprising:
   inductor means for coupling to an external source of ac electrical energy to induce an alternating voltage in said inductor means;
   light emitting diode means connected in series with said inductor means, said light emitting diode producing a visual indication when dc charging current is flowing therethrough and indicating by maximum emitted light when the coupling between said inductor means and said external source of ac electrical energy is optimized; and
   the series combination of said inductor means and said light emitting diode connected in parallel with said battery in a polarity to produce a dc charging current through said battery from such alternating voltage.

6. In a self-contained hearing aid having a rechargeable battery in parallel with the series combination of an inductor and a diode, the battery charging system comprising:
   at least one electrical oscillator having a resonant circuit including an air core inductor;
   dc power supply means connected to said oscillator, the output of said dc power supply much greater than required by said oscillator;
   resistor voltage dropping means disposed between said power supply and said oscillator for reducing said output to that required by said oscillator, said dropping resistor thereby producing radiated heat; and
   a non-magnetic hearing aid holding cup disposed within the air core of said air core inductor, said cup adapted to receive and hold said hearing aid in a position in which the axis of said hearing aid inductor is essentially parallel to the axis of said air core inductor of said oscillator whereby an electromotive force is induced in said hearing aid inductor, said diode providing charging current to said rechargeable battery, said hearing aid holding cup having a multiplicity of openings in the bottom surface thereof, said cup disposed directly over said voltage dropping resistor means whereby said radiated heat passes through said multiplicity of openings to thereby remove moisture from said hearing aid held in said cup.

* * * * *